United States Patent [19]
Arnold et al.

[11] 3,977,640
[45] Aug. 31, 1976

[54] BRACKETS FOR MOUNTING ELECTRICAL WIRING BOXES TO SUPPORTING STRUCTURES

[75] Inventors: William O. Arnold, Parkersburg, W. Va.; Gene F. Mills, Belpre, Ohio

[73] Assignee: Union Insulating Company, Parkersburg, W. Va.

[22] Filed: Oct. 14, 1975

[21] Appl. No.: 621,677

[52] U.S. Cl. .............................. 248/205 R; 174/58; 220/3.9
[51] Int. Cl.[2] ..................... H02G 3/08; F16B 2/24; F16B 15/00
[58] Field of Search ............... 248/205 R, 228, 229, 248/DIG. 6, 226 E; 52/758 M, DIG. 1; 220/3.9; 174/58

[56] References Cited
UNITED STATES PATENTS

| | | | |
|---|---|---|---|
| 1,642,945 | 9/1927 | Davidson | 52/DIG. 1 X |
| 1,963,951 | 6/1934 | Bowers | 174/58 UX |
| 3,522,924 | 8/1970 | Arnold | 220/3.9 X |
| 3,780,209 | 12/1973 | Schuplin | 248/DIG. 6 X |

*Primary Examiner*—J. Franklin Foss
*Attorney, Agent, or Firm*—Peter Xiarhos; Elmer J. Nealon; Norman J. O'Malley

[57] ABSTRACT

Metal mounting brackets for mounting electrical wiring boxes to studs. A metal mounting bracket in accordance with a first embodiment of the invention is basically Z-shaped and includes a first flat portion adapted to be attached to an electrical wiring box, a second flat portion generally normal to the first portion and including a pair of generally U-shaped stud-embracing members, and a third flat portion generally normal to the second portion and having a pair of spaced, initially-flat pair of tabs extending outwardly from an edge thereof, each of the tabs having a pair of stud-biting teeth extending therefrom. The third portion further has a pair of tool-receiving openings therein, each adjacent to a corresponding one of the tabs and arranged to receive a standard adjustable plier. In mounting a wiring box to a stud, for example, to a metal stud, the U-shaped members of the second portion of the bracket are first arranged by an installer to embrace a first corner region of the stud. The installer then uses the adjustable plier to bend the tabs associated with the third portion around a second curved corner region of the stud and to cause the teeth associated with the tabs to bite into the second corner region of the stud, thereby securely mounting the bracket and the attached wiring box to the stud.

A metal mounting bracket in accordance with a second embodiment of the invention is similar to the abovedescribed first embodiment but does not have stud-biting teeth associated with the tabs.

14 Claims, 9 Drawing Figures

BRACKETS FOR MOUNTING ELECTRICAL WIRING BOXES TO SUPPORTING STRUCTURES

BACKGROUND OF THE INVENTION

The present invention relates to metal mounting brackets and, more particularly, to metal mounting brackets for mounting electrical wiring boxes to supporting structures such as metal studs.

A number of mounting brackets of different design for mounting electrical wiring boxes to supporting structures such as metal studs are well known to those skilled in the art. By way of example, in the prior art, mounting brackets have been utilized and/or described which variously include features such as clips for securely gripping the edges or flanges of metal studs (e.g., U-shaped or C-shaped studs); teeth, prongs or barbs for biting into interior or exterior portions of metal studs; resilient snap-on gripping members or slotted members arranged to be attached to interior portions, edges or flanges of metal studs (for example, after the studs have first been deflected or flexed by hand to permit insertion of the members into the interior of the studs); tabs arranged to be bent around edges or flanges of studs and to be secured thereto; spring-loaded members capable of being flexed by hand to allow insertion into the interior of studs; and members arranged to be secured to studs by fastening devices such as self-tapping metal screws and nut-and-bolt arrangements. Many of the brackets of the prior art avoid the need for installation tools, even simple and commonplace tools such as pliers and screwdrivers, and some of the brackets are adjustable, or removable by hand once mounted to studs. Examples of the above and other features of mounting brackets are illustrated and described in U.S. Pat. Nos. 1,930,242; 3,360,151; 3,376,005; 3,474,994; 3,491,974; 3,522,924; 3,588,019; 3,606,223; 3,684,230; 3,720,395; 3,730,466; and 3,780,209.

While the prior art mounting brackets having the abovedescribed features appear to offer reasonable solutions to the problem of mounting wiring boxes to metal studs, they nonetheless have certain drawbacks and disadvantages. Many of the brackets, for example, are very complex in design, difficult to install, require close manufacturing tolerances and are difficult to manufacture at low cost, particularly if the brackets have multiple parts or have numerous bends or intricate shapes and require special treating, such as welding or heat-treating. Many of the brackets are usable with studs of only a single depth and many of the brackets cannot be used on both sides of studs or with I-shaped studs. Further, the avoidance of installation tools in several instances is accomplished at the expense of brackets of complex and intricate design and without significant reduction, if at all, of the labor content and expense of the installation process.

BRIEF SUMMARY OF THE INVENTION

In accordance with the present invention, mounting brackets are provided for use with boxes such as electrical wiring boxes which avoid the drawbacks and disadvantages associated with the prior art mounting brackets as briefly described hereinabove. The mounting brackets in accordance with the present invention are of one-piece design, strong and sturdy, do not require close manufacturing tolerances, have few bends and no intricate shapes, can be manufactured at low cost, for example, out of sheet metal, using standard, well-known stamping and metal working techniques, and require no special treating such as welding or heat treating. The installation of the mounting brackets with respect to supporting structures such as metal studs is accomplished in a simple and straight-forward manner using a standard adjustable plier as ordinarily employed by an electrical contractor in the general performance of his work. The mounting brackets can be used with studs of varying depths and on both sides of studs such as I-shaped studs.

A mounting bracket in accordance with the present invention for use with a metal supporting structure (e.g., a metal stud) comprises a first portion adapted to be attached to a box (e.g., an electrical wiring box) and a second portion connected with the first portion. The supporting structure as used with the present invention has a first corner region and a second corner region adjacent to the first corner region.

The first portion of the mounting bracket includes an embracing means generally conforming to the configuration of the first corner region of the supporting structure and adapted to embrace the first corner region in preparation for attaching the mounting bracket to the supporting structure. The second portion of the mounting bracket is adapted to be positioned against the supporting structure between the first and second corner regions of the supporting structure in preparation for attaching the mounting bracket to the supporting structure and includes a deformable means. The deformable means is capable of being deformed by a tool and is arranged initially to extend past the second corner region of the supporting structure and, when deformed, to conform generally to the configuration of and embrace the second corner region of the supporting structure. The second portion of the mounting bracket further has a tool-receiving opening therein adjacent to the deformable means. The tool-receiving opening is adapted to receive a tool whereby the tool may be used to deform the deformable means of the second portion to cause the deformable means to conform to and embrace the second corner region of the supporting structure whereby the mounting bracket is caused to be attached to the supporting structure.

BRIEF DESCRIPTION OF THE DRAWING

Various objects, features and advantages of mounting brackets for electrical wiring boxes in accordance with the present invention will be apparent from the following detailed discussion taken in conjunction with the accompanying drawing in which.

DETAILED DESCRIPTION OF THE INVENTION

Figure 3:
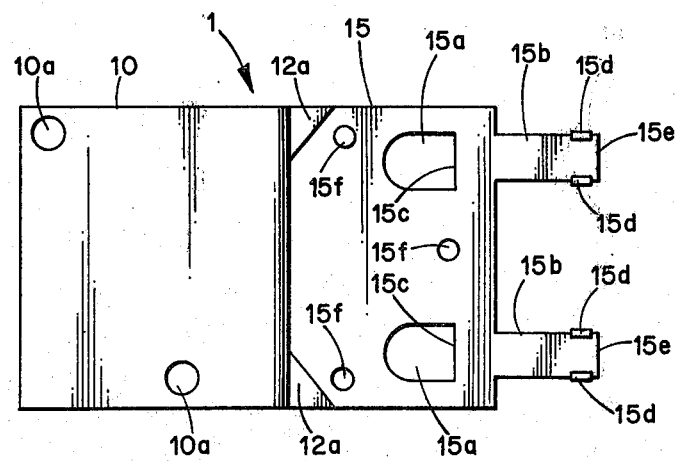
Figure 4:
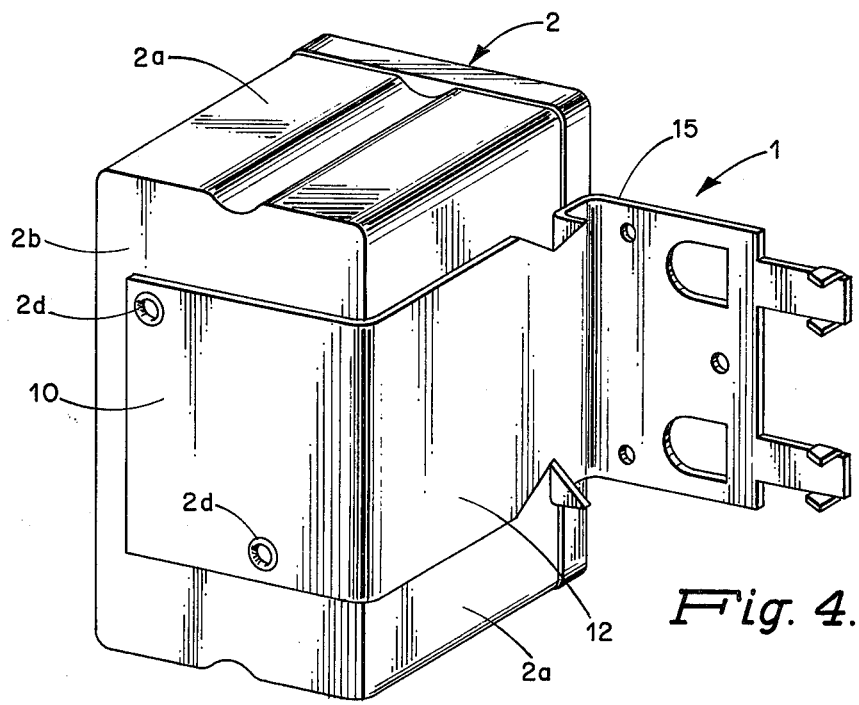
FIG. 4 is a perspective view illustrating the manner in which the mounting bracket of FIGS. 1–3 is attached to an electrical wiring box.
Figure 5:
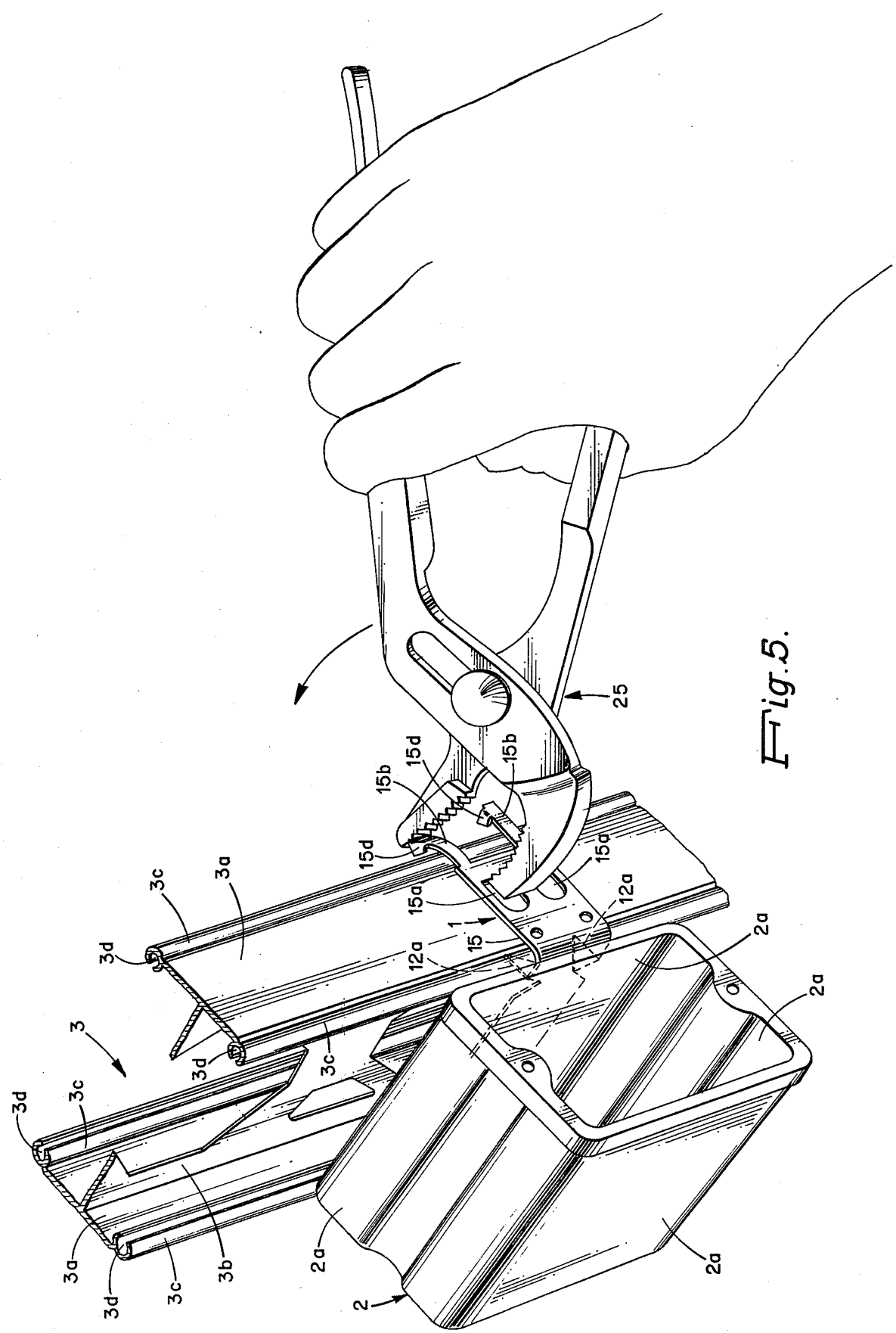
FIGS. 5, 6 and 7 are perspective, top and front views, respectively, illustrating the manner in which the mounting bracket of FIGS. 1–3 and the attached electrical wiring box are mounted to a metal stud.
Figure 6:
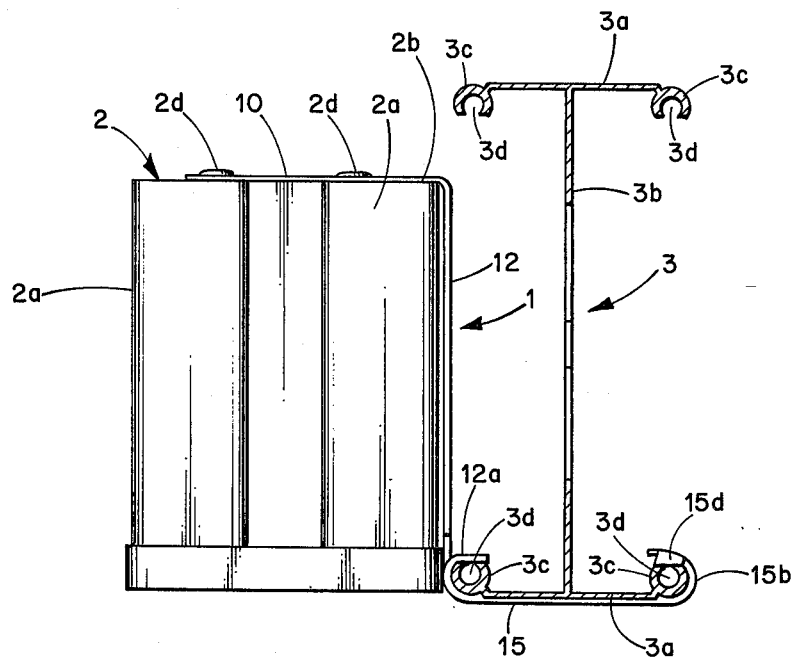
Figure 7:
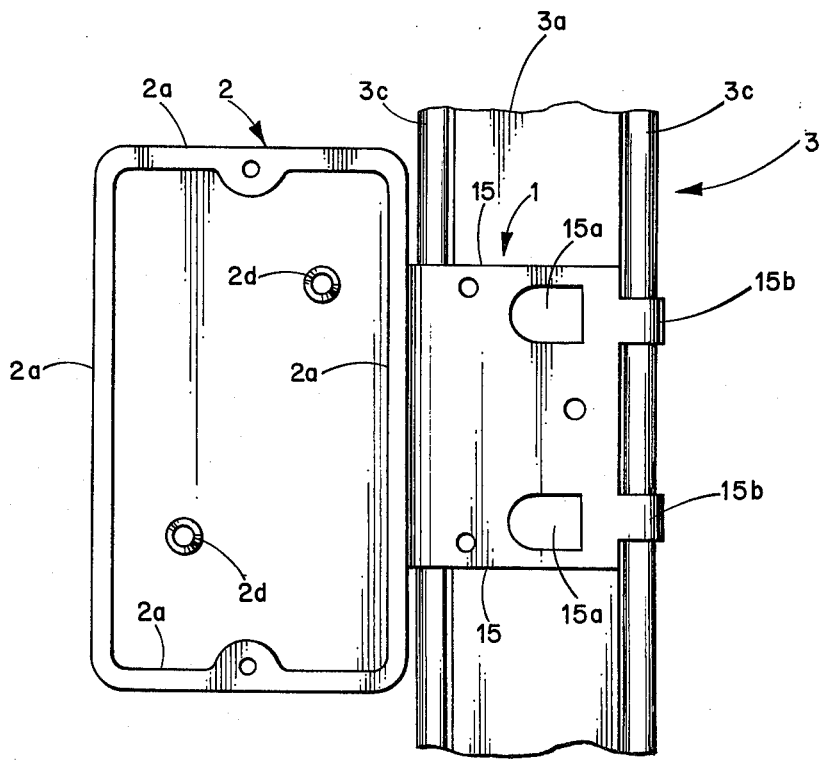

Referring now to FIGS. 1–7, there is shown a mounting bracket 1 in accordance with a first embodiment of the invention. The mounting bracket 1 is employed with an electrical wiring box 2 as shown in FIGS. 4–7 for mounting the wiring box 2 to a metal stud 3 as shown in FIGS. 5–7. The electrical wiring box 2 is of a conventional construction, for example, of a molded phenolic plastic composition, and comprises a plurality of side walls 2a and a rear wall 2b arranged to enclose a volume or space for receiving an electrical device such as an outlet or receptacle (not shown). The metal stud 3 is also of a conventional construction, for example, of an I configuration and typically of extruded aluminum, and comprises front and rear parallel, vertical sections 3a joined centrally by a vertical web section 3b normal to the sections 3a. As best shown in FIGS. 5 and 6, each of the sections 3a further has a pair of elongated curved corner channel portions 3c, each having a U configuration and defining an elongated channel slot 3d. The corner channel portions 3c are utilized, in a manner well known and understood by those skilled in the art, to facilitate the interconnection and installation of several metal studs of a type as shown in the drawing in the construction of walls of a building or other structure.

Figure 1:
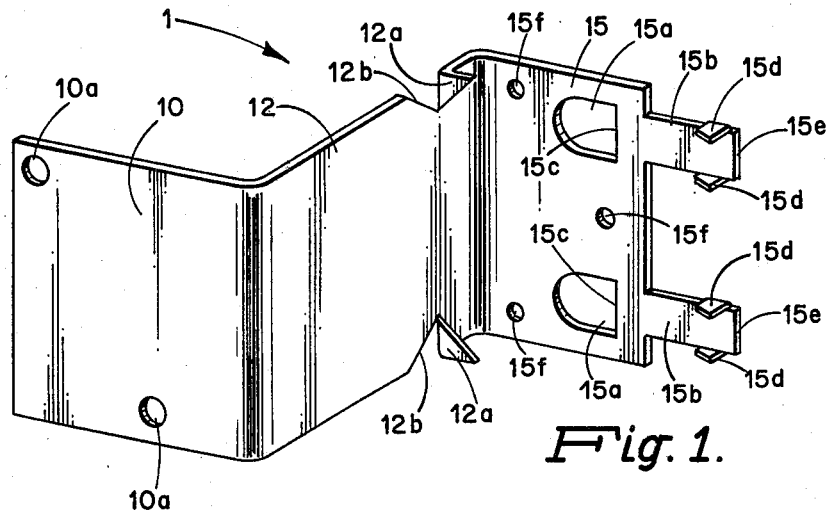
FIGS. 1–3 are perspective, top and side views, respectively, of a mounting bracket in accordance with a first embodiment of the invention.
Figure 2:
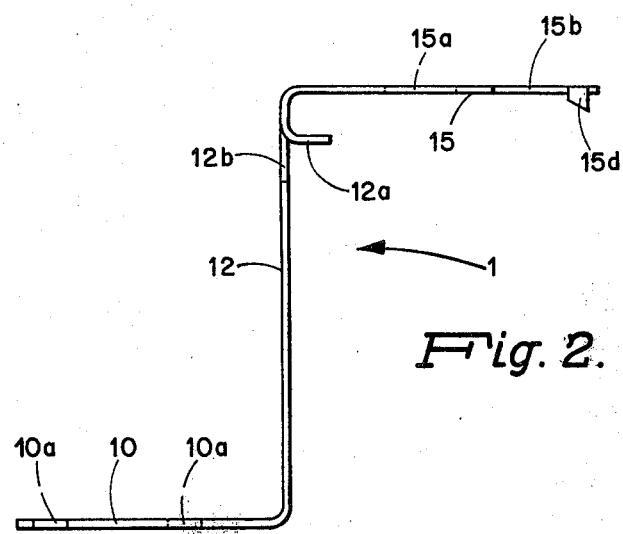

The mounting bracket 1 of FIGS. 1–3 is basically of a Z configuration and, as shown in FIGS. 1–3, comprises a first flat portion 10, a second flat portion 12 integral with and generally normal to the first flat portion 10, and a third flat portion 15 integral with and generally normal to the second flat portion 12. The first portion 10 of the bracket is adapted to be attached to the wiring box 2 and, for this reason, is provided with a pair of openings 10a for use with rivets 2d as shown in FIG. 4 and 7 for attaching the bracket 1 to the wiring box 2. Any other suitable means for attaching the portion 10 of the bracket 1 to the wiring box 2 may also be used.

The second portion 12 of the bracket 1 is arranged to be positioned closely adjacent to one of the vertical side walls 2a of the wiring box 2 and generally parallel to the web section 3b of the stud 3, as shown in FIGS. 5–7. As shown in FIGS. 1–3, the second portion 12 of the bracket 1 includes a pair of pointed, generally U-shaped stud-embracing members 12a formed therein for embracing one of the corner channel portions 3c of one of the stud sections 3a, as will be described in greater detail hereinafter. The U-shaped members 12a are formed in a simple manner by making angular slits in the portion 12, as shown at 12b in FIGS. 1 and 2, and bending the material of the bracket 1 adjacent to the slits 12b upwardly to form the U-shape of the members 12a.

The third portion 15 of the bracket 1 is arranged to abut against the front surface of one of the sections 3a of the stud 3, as best shown in FIGS. 5 and 6, and has a pair of tool-receiving openings 15a therein and a pair of tabs 15b integral with and extending outwardly from the portion 15 in the same plane as the portion 15. Each of the tabs 15b further has a pair of parallel stud-biting teeth 15d integral therewith and generally normal to the flat surfaces of the tabs 15b. As will be described in greater detail hereinafter, the openings 15a are used in conjunction with a standard adjustable plier and the adjacent tabs 15b to securely and permanently mount the bracket 1 with the wiring box 2 attached thereto to the stud 3.

The bracket 1 as described hereinabove is typically constructed from a flat sheet metal blank using conventional stamping and metal-working techniques. The bracket 1 is of a simple, one-piece design, as clearly indicated in the drawing, and has a small number of simple, easily-formed bends and has no complex or intricate shapes. No close manufacturing tolerances or special treatment of the bracket 1, or the material thereof, are required. Accordingly, the cost of the bracket 1 is low compared with the majority of the brackets disclosed in the prior art.

The bracket 1 and the wiring box 2 attached thereto are mounted to the stud 3 in the manner as shown in FIGS. 5–7. The bracket 1 is initially positioned by an installer with respect to the stud 3 so that the portion 12 is parallel to the web section 3b of the stud 3 and the U-shaped members 12a of the portion 12 embrace one of the C-shaped corner channel portions 3c of the stud 3, for example, the left-hand corner channel portion 3c of the front section 3a of the stud 3 as shown in FIGS. 5 and 6. This positioning operation places the portion 15 of the bracket 1 in abutment with the front surface, or face, of the front section 3a of the stud 3 with the tabs 15b extending outwardly past the right-hand corner channel portion 3c of the stud 3 in the same plane as the front section 3a, as also shown in FIG. 5. The installer then places the upper jaw of a plier 25 within one of the openings 15a in the portion 15 and also against an inner surface 15c (FIGS. 1 and 3) of the portion 15, and places the lower jaw of the plier 15 against the exposed edge surface of the adjacent tab 15b, the exposed edge surface being a tool-receiving surface and shown at 15e in FIGS. 1 and 3. The installer then draws the upper and lower jaws of the plier 25 together, by squeezing the plier handles together, and imparts a counterclockwise motion to the plier 25. As a result, the tab 15b is caused to bend around and embrace the right-hand corner channel portion 3c of the stud 3. Continued squeezing of the plier handles causes the teeth 15d extending from the tab 15b to bite into the corner channel portion 3c and, as the material of the channel portion 3c is deformed by the biting action, to enter part way into the elongated channel slot 3d. The tab 15b is accordingly securely clamped to the stud 3. The same operations as described above are also performed with respect to the other opening 15a and the other tab 15b to cause the tab 15b to be securely attached to the stud 3. The above operations are facilitated by the fact that the U-shaped members 12a, by their stud-embracing action, are drawn in a direction toward the tabs 15b and confine the portion 15 of the bracket 1 against the front surface of the front section 3a of the stud 3, thereby preventing the portion 15 from moving away normally from the front section 3a as the tabs 15b are caused to bend around the corner channel portion 3c and the teeth 15d to bite into the channel portion 3c. A suitable form of the adjustable plier 25 is a so-called multi-purpose pump plier or tongue and groove plier, 9½ inches in length, such as sold by Channellock, Inc., Meadville, Pa., under Model Number 420. This type of plier is generally included in the varied assortment of tools normally used by, and often physically carried on the person of, an electrician or electrical contractor in the course of the performance of his work. Accordingly, there is no need to obtain a specially-designed tool to accomplish the aforedescribed bracket-mounting operations.

While the bracket 1 and the attached wiring box 2 have been described hereinabove and illustrated in the drawing as being mounted to the stud 3 from the left side of the stud 3, the symmetrical natures of the bracket 1, the wiring box 2 and the stud 3 allow the bracket 1 and the attached wiring box 2 to be mounted to the stud 3 from the right side of the stud 3, in the same manner as described hereinabove. Further, the mounting of the bracket 1 and the attached wiring box 2 is not limited by the depth of the stud 3. As a result, the bracket 1, the wiring box 2 and the I-shaped stud 3 offer greater versatility in the mounting of the bracket 1 and the wiring box 2 than is possible with currently-available brackets and U-shaped or C-shaped studs.

The bracket 1 as described hereinabove may also be used with a wood stud. In this case, the use of the plier 25 as described hereinabove causes the tips or points of the U-shaped members 12a to be drawn into and cut into the wood stud and embrace the corner thereof while, at the same time, the tabs 15b are bent around the adjacent corner and the teeth 15d caused to bite into the wood stud. To insure that the bracket 1 is securely mounted to the wood stud, nails such as roofer's nails may be driven through the openings 15a into the wood stud. Alternatively, openings such as shown at 15f in FIG. 1 may be used either alone, or together with the openings 15a for receiving nails of any suitable kind for securing the bracket 1 to the wood stud.

Figure 8:
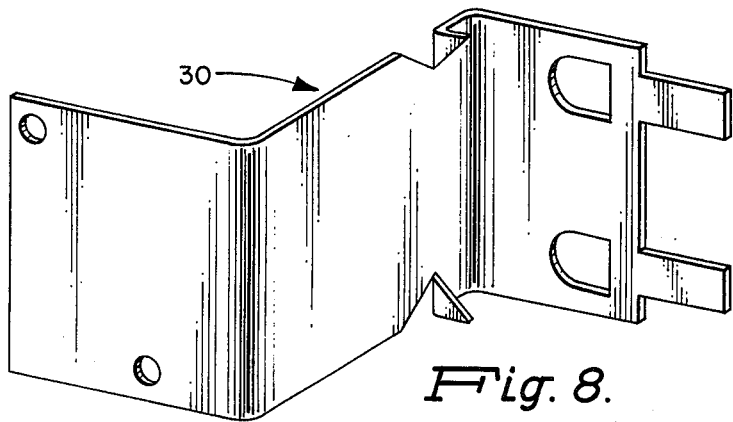
FIGS. 8 and 9 are perspective and top views, respectively, of a mounting bracket in accordance with a second embodiment of the invention.
Figure 9:
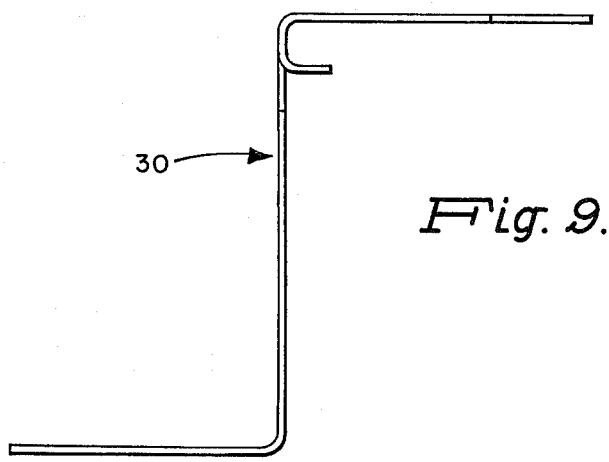

Referring now to FIGS. 8 and 9, there is shown a mounting bracket 30 in accordance with a second embodiment of the invention. The design of the mounting bracket 30 is the same as that of the aforedescribed bracket 1 with the exception that no teeth 15d or openings 15f as employed by the bracket 1 are employed by the bracket 30. As a result, the bracket 30 is most suited for use with metal studs. The mounting of the bracket 30 with an attached wiring box to a metal stud is accomplished in the same general manner as described above, using an adjustable plier to cause the tabs of the bracket 30 to bend around and to be tightly secured to a channel portion of the stud. Since the bracket 30 does not use teeth with the tabs, there is no stud-biting effect as with the bracket 1.

While there have been described what are considered preferred embodiments of the invention, it will be obvious to those skilled in the art that various changes and modifications may be made therein without departing from the invention as called for in the appended claims.

What is claimed is:

1. A mounting bracket for mounting a box to a metal supporting structure and adapted to be attached to the supporting structure, said supporting structure having a first corner region and a second corner region adjacent to the first corner region, said mounting bracket comprising:
   a first portion adapted to be attached to a box and including embracing means generally conforming to the configuration of the first corner region of the supporting structure and adapted to embrace said first corner region in preparation for attaching the mounting bracket to the supporting structure; and
   a second portion connected with the first portion and adapted to be positioned against the supporting structure between the first and second corner regions of the supporting structure in preparation for attaching the mounting bracket to the supporting structure, said second portion including deformable means capable of being deformed by a tool and arranged initially to extend past the second corner region of the supporting structure and, when deformed, to conform generally to the configuration of and embrace the second corner region of the supporting structure, and said second portion further having a tool-receiving opening therein adjacent to the deformable means, said tool-receiving opening being adapted to receive a tool whereby said tool may be used to deform the deformable means of the second portion to cause the deformable means to conform to and to embrace the second corner region of the supporting structure whereby the mounting bracket is caused to be attached to the supporting structure.

2. A mounting bracket in accordance with claim 1 wherein:
   the second portion of the mounting bracket has a tool-receiving surface at the tool receiving-opening; and
   the deformable means also has a tool-receiving surface;
   the tool-receiving surface at the tool-receiving opening and the tool receiving surface of the deformable means being jointly used by a tool for deforming the deformable means to cause the deformable means to conform generally to the configuration of and embrace the second corner region of the supporting structure.

3. A mounting bracket in accordance with claim 2 wherein:
   the first and second corner regions of the supporting structure are generally U-shaped;
   the embracing means includes a generally U-shaped member; and
   the deformable means includes an initially-flat deformable tab having an outer, tool-receiving surface.

4. A mounting bracket in accordance with claim 1 further comprising:
   teeth means connected with the deformable means and adapted to bite into the second corner region of the supporting structure when the deformable means is caused to embrace the second corner region of the supporting structure.

5. A mounting bracket in accordance with claim 4 wherein:
   the first and second corner regions of the supporting structure are generally U-shaped;
   the embracing means includes a generally U-shaped member;
   the deformable means includes an initially-flat deformable tab having an outer, tool-receiving surface; and
   the teeth means includes teeth connected with and extending from the deformable tab.

6. A mounting bracket for mounting a box to a metal supporting structure and adapted to be attached to the supporting structure, said supporting structure having a first corner region and a second corner region adjacent to the first corner region, said mounting bracket comprising:
   a first portion adapted to be attached to a box and including embracing means generally conforming to the configuration of the first corner region of the supporting structure and adapted to embrace said first corner region in preparation for attaching the mounting bracket to the supporting structure; and
   a second portion connected with the first portion and adapted to be positioned against the supporting structure between the first and second corner regions of the supporting structure in preparation for attaching the mounting bracket to the supporting structure, said second portion including first and second deformable means capable of being deformed by a tool and arranged initially to extend past the second corner region of the supporting structure and, when deformed, to conform generally to the configuration of and embrace the second corner region of the supporting structure, and said second portion further having first and second tool-receiving openings therein adjacent to the first and second deformable means, respectively, said tool-receiving openings being adapted to receive a tool whereby said tool may be used to deform the first and second deformable means to cause the first and second deformable means to conform to and embrace the second corner region of the supporting structure whereby the mounting bracket is caused to be attached to the supporting structure.

7. A mounting bracket in accordance with claim 6 wherein:
the second portion of the mounting bracket has first and second tool-receiving surfaces at the first and second tool-receiving openings, respectively; and
the first and second deformable means also have first and second tool-receiving surfaces, respectively;
the first and second tool-receiving surfaces at the first and second tool-receiving openings and the first and second tool-receiving surfaces of the first and second deformable means being used by a tool for deforming the first and second deformable means to conform generally to the configuration of and embrace the second corner region of the supporting structure.

8. A mounting bracket in accordance with claim 7 wherein:
the first and second corner regions of the supporting structure are generally U-shaped;
the embracing means includes first and second generally U-shaped members; and
each of the first and second deformable means includes an initially-flat deformable tab having an outer, tool-receiving surface.

9. A mounting bracket in accordance with claim 6 further comprising:
teeth means connected with the first and second deformable means and adapted to bite into the second corner region of the supporting structure when the first and second deformable means are caused to embrace the second corner region of the supporting structure.

10. A mounting bracket in accordance with claim 9 wherein:
the first and second corner regions of the supporting structure are generally U-shaped;
the embracing means includes first and second generally U-shaped members;
each of the first and second deformable means includes an initially-flat deformable tab having an outer, tool-receiving surface; and
the teeth means includes teeth connected with and extending from the deformable tabs.

11. A mounting bracket for mounting a box to a wood supporting structure and adapted to be attached to the wood supporting structure, said wood supporting structure having a first corner region and a second corner region adjacent to the first corner region, said mounting bracket comprising:

a first portion adapted to be attached to a box and including tip means adapted to be positioned against the first corner region of the supporting structure in preparation for attaching the mounting bracket to the supporting structure and capable of penetrating for essentially its entire length into the supporting structure; and
a second portion connected with the first portion and adapted to be positioned against the supporting structure between the first and second corner regions of the supporting structure in preparation for attaching the mounting bracket to the supporting structure, said second portion including deformable means and teeth means connected with the deformable means, said deformable means being arranged initially to extend past the second corner region of the supporting structure and being capable of being deformed by a tool and said teeth means being capable of penetrating the supporting structure at the second corner region thereof for essentially its entire length when the deformable means has been deformed by the tool, and said second portion further having a tool-receiving opening therein adjacent to the deformable means, said tool-receiving opening being adapted to receive a tool whereby said tool may be used to deform simultaneously the deformable means of the second portion of the mounting bracket so as to cause the teeth means to penetrate into the supporting structure at the second corner region thereof and to cause the tip means of the first portion of the mounting bracket to penetrate into the supporting structure at the first corner region thereof, thereby to attach the mounting bracket to the supporting structure.

12. A mounting bracket in accordance with claim 11 wherein:
the second portion of the mounting bracket has a tool-receiving surface at the tool-receiving opening; and
the deformable means also has a tool-receiving surface;
the tool-receiving surface at the tool-receiving opening and the tool receiving surface of the deformable means being used by a tool for simultaneously deforming the deformable means of the second portion of the mounting bracket so as to cause the teeth means to penetrate into the supporting structure at the second corner region thereof and to cause the tip means of the first portion of the mounting bracket to penetrate into the supporting structure at the second corner region thereof.

13. A mounting bracket in accordance with claim 12 wherein:
the deformable means includes an initially-flat deformable tab having an outer, tool-receiving surface; and
the teeth means includes teeth connected with and extending from the deformable tab.

14. A mounting bracket in accordance with claim 13 wherein:
the second portion of the mounting bracket further has an additional opening therein for receiving a fastener to be driven into the supporting structure.

* * * * *